(12) United States Patent
Hecht

(10) Patent No.: US 8,764,351 B2
(45) Date of Patent: Jul. 1, 2014

(54) CUTTING INSERT WITH FLEXIBILITY APERTURE AND CUTTING TOOL THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 168 days.

(21) Appl. No.: 13/615,266

(22) Filed: Sep. 13, 2012

(65) Prior Publication Data

US 2014/0072379 A1 Mar. 13, 2014

(51) Int. Cl.
*B23B 27/00* (2006.01)
*B23C 5/02* (2006.01)

(52) U.S. Cl.
USPC .......................................... 407/108; 407/110

(58) Field of Classification Search
CPC ............ B23B 2200/12; B23B 2200/20; B23B 2200/125; B23B 2200/3618
USPC ............................... 407/108, 110, 109, 18, 19
See application file for complete search history.

(56) References Cited

U.S. PATENT DOCUMENTS

| | | | |
|---|---|---|---|
| 3,662,443 A | | 5/1972 | Schmidt |
| 4,443,136 A | * | 4/1984 | Kemmer .......................... 407/72 |
| 5,092,212 A | * | 3/1992 | Pawlosky ......................... 83/845 |
| 5,203,648 A | | 4/1993 | Bohannan et al. |
| 6,227,771 B1 | | 5/2001 | Lagerberg et al. |
| 6,244,790 B1 | * | 6/2001 | Kingdom et al. ............. 407/110 |
| 6,273,651 B1 | | 8/2001 | Heinloth et al. |
| 6,612,207 B2 | | 9/2003 | Schiffers |
| 6,702,524 B2 | | 3/2004 | Miller et al. |
| 6,767,168 B2 | | 7/2004 | Miller |
| 6,872,033 B2 | | 3/2005 | Rydberg |
| 7,407,347 B2 | * | 8/2008 | Virtanen et al. ............... 407/110 |
| 8,317,434 B2 | * | 11/2012 | Oettle ............................ 407/110 |
| 2011/0293382 A1 | | 12/2011 | Chistyakov |
| 2011/0305532 A1 | | 12/2011 | Harif |
| 2013/0170918 A1 | * | 7/2013 | Hecht ............................ 407/110 |

FOREIGN PATENT DOCUMENTS

| | | |
|---|---|---|
| BR | PI0805470-3 A2 | 9/2010 |
| DE | 9002895 U1 | 5/1990 |
| DE | 9218472 U1 | 8/1994 |
| DE | 102005014121 A1 | 9/2006 |
| DE | 102006017458 A1 | 9/2007 |
| DE | 202011105832 U1 | 10/2011 |
| GB | 2085333 A | 4/1982 |

* cited by examiner

*Primary Examiner* — Will Fridie, Jr.
(74) *Attorney, Agent, or Firm* — Womble Carlyle

(57) ABSTRACT

An indexable cutting insert has mutually perpendicular longitudinal, lateral and vertical axes. The insert includes two opposite cutting portions and a clamping portion therebetween, arranged parallel to the longitudinal axis. Each cutting portion includes a rake surface and front and side relief flanks, and a cutting edge formed at an intersection of the rake surface and front relief flank. A second width of the clamping portion is greater than the first width of the cutting edges. The clamping portion has two resilient beams and a flexibility aperture opening out to side abutment surfaces of the clamping portion, allowing elastic deformation of the insert along the vertical axis. The cutting insert may further include two opposite stopper portions, each formed on a respective insert end surfaces, each stopper portion forming a step in the respective insert end surface. A cutting tool clamps one or more inserts at their clamping portions.

18 Claims, 5 Drawing Sheets

CUTTING INSERT WITH FLEXIBILITY APERTURE AND CUTTING TOOL THEREFOR

FIELD OF THE INVENTION

The present invention relates to a cutting insert and a cutting tool holder for retaining the cutting insert or multiple cutting inserts, in general, and to a cutting insert and cutting tool for multi grooving and parting operations, in particular.

BACKGROUND OF THE INVENTION

Metal cutting tools used in turning operations include cutting inserts which are removably secured in a tool holder. The cutting inserts are usually formed of a suitably hard material, i.e., cemented carbide, where the tool holder is formed of a less hard material, and is reusable following the disposal of a worn or damaged cutting insert. In particular, metal cutting tools for multi grooving and parting capable of simultaneously cutting multiple grooves in a work piece, having a holder for retaining a plurality of replaceable cutting inserts therein in a side by side seating. The cutting inserts must be accurately aligned with respect to one another, to assure preciseness and repeatability.

Some cutting inserts and tool holders have arrangements for positioning the cutting insert in a desired location in the cutting tool, or for determining the extent of entry of the cutting insert into the tool holder. Some cutting inserts have a central opening for receiving a tightening screw, either centrally or at the side of the opening. Examples of such cutting tools and cutting inserts are disclosed in DE9218472U1, DE102005014121A1, DE102006017458A1, DE202011105832U1, DE9002895U1, GB2085333, U.S. Pat. No. 3,662,443, U.S. Pat. No. 6,702,524, U.S. Pat. No. 6,612,207, U.S. Pat. No. 6,767,168, U.S. Pat. No. 6,227,771, U.S. Pat. No. 6,872,033, US2011/293382, US2011/0305532, and BRPI0805470.

It is an object of the present invention to provide an improved cutting insert for multi grooving and parting applications, and a cutting tool with a tool holder retaining such a cutting insert or a plurality of such cutting inserts. Each cutting insert has a clamping portion with two resilient beams and a flexibility aperture, to allow elastic deformation of the cutting insert in the vertical direction. This allows the tool holder to retain a plurality of cutting inserts, overcoming a case of slightly different insert heights.

SUMMARY OF THE INVENTION

In accordance with one aspect of the present invention, there is provided an indexable cutting insert having an insert longitudinal axis, an insert lateral axis and an insert vertical axis, the cutting insert comprising:
two opposite insert end surfaces, and a peripheral surface extending therebetween;
two opposite cutting portions and a clamping portion located therebetween, arranged along the insert longitudinal axis,
wherein:
each of the cutting portions comprises a rake surface a front relief flank and two side relief flanks, with a cutting edge formed at an intersection of the rake surface and the front relief flank, the side relief flanks defining a first width;
the clamping portion does not include the cutting edges, and comprises:
first and second side abutment surfaces extending between the two insert end surfaces, the first and second side abutment surfaces defining a second width, the second width being greater than the first width,
two opposite elongated resilient beams with a flexibility aperture therebetween, the flexibility aperture opening out to the first and second side abutment surfaces, each of the resilient beams is located between a respective one of the insert end surfaces and the flexibility aperture, the flexibility aperture being spaced apart from the cutting portions,
the only resilient portions of the cutting insert are the two resilient beams.

In accordance with another aspect of the present invention, there is further provided a cutting tool comprising a tool holder and at least one cutting insert as described above.
The tool holder comprises:
an upper retainer having an upper retainer clamping surface;
a base retainer having at least a first base retainer clamping surface;
an insert receiving pocket defined between the upper retainer and the base retainer, and having a front end and a rear end; and
a holder top surface extending above the upper retainer in a side view of the tool holder,
the at least one cutting insert is retained within the insert receiving pocket, with one of the insert end surfaces being located adjacent the upper retainer clamping surface, and the other one of the insert end surfaces abutting the at least first base retainer clamping surface,
the cutting tool has a first state and a second state, where in the first state each of the at least one cutting insert is in a non-clamped position, and in the second state the at least one cutting insert is in a clamped position,
in the first state of the cutting tool no force is applied on the holder top surface, and
in the second state of the cutting tool a force is applied on the holder top surface, and the upper retainer clamping surface is pressed against the adjacent insert end surfaces of each of the at least one cutting insert along the respective resilient beam and the respective resilient beams of each of the at least one cutting insert bends towards the base retainer.

In accordance with yet a further aspect of the present invention, there is provided an insert stack comprising a plurality of indexable cutting inserts as described above, wherein the cutting inserts are arranged side by side, with a given side abutment surface of each of the cutting inserts abutting a different side abutment surface of an adjacent one of the cutting inserts.

BRIEF DESCRIPTION OF THE DRAWINGS

For a better understanding, the invention will now be described, by way of example only, with reference to the accompanying drawings, in which.

Figure 1:
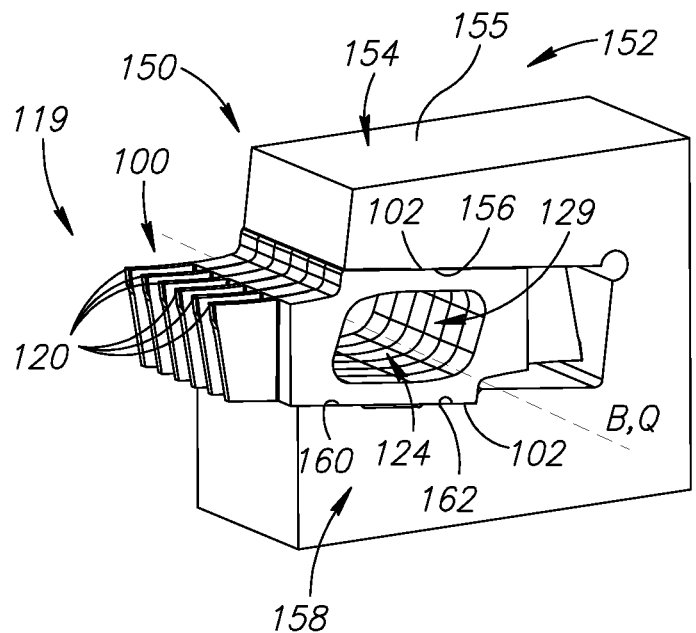
FIG. 1 is a perspective view schematic illustration of a cutting tool in accordance with an embodiment of the present invention, in an assembled state.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

The present invention relates to an indexable cutting insert, and a cutting tool having a tool holder for retaining at least one cutting insert in an insert receiving pocket. The cutting tool may include a plurality of cutting inserts, arranged side by side in a tight stack, and forming a series of spaced apart cutting edges. The cutting insert has two opposite cutting portions and a clamping portion therebetween. Each cutting portion includes a cutting edge of a first width. The clamping portion is limited between two side abutment surfaces, defining a second width, greater than the first width. The clamping portion also has two resilient beams with a flexibility aperture formed therebetween and opening out to the side abutment surfaces. Further, the cutting insert may include two opposite stopper portions for abutting a corresponding holder stopper portion, preventing the cutting insert from moving further into the insert receiving pocket. The cutting tool is for performing metal cutting machining operations, and the cutting insert is usually formed of a hard metal, such as pressed cemented carbide, cermet, and the like.

Figure 2:
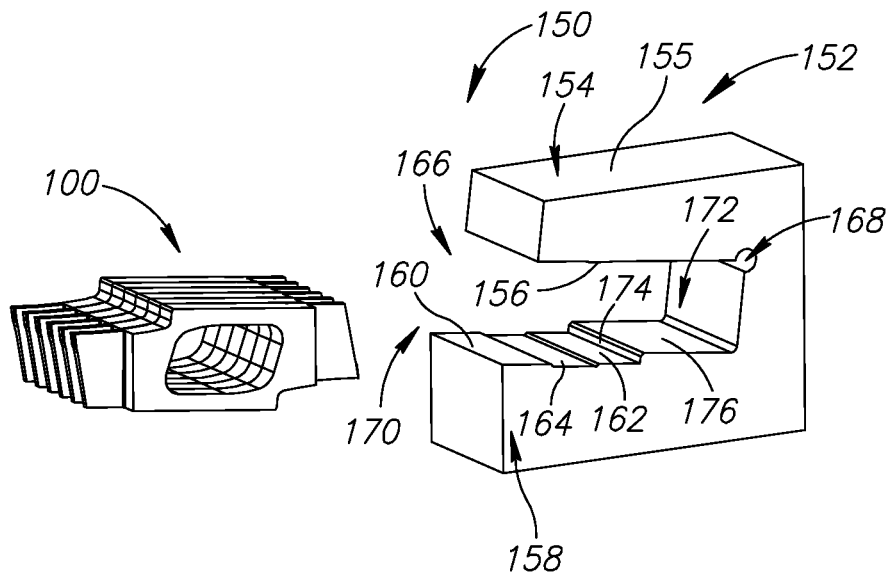
FIG. 2 is a perspective view schematic illustration of the cutting tool of FIG. 1, in a non-assembled state.
Figure 3:
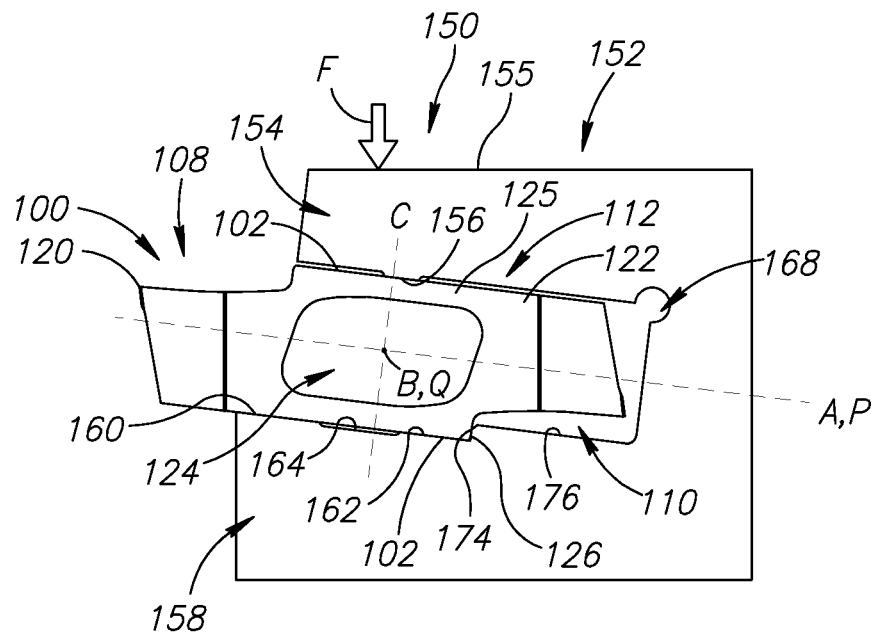
FIG. 3 is a side view of the cutting tool of FIG. 1.
Figure 4:
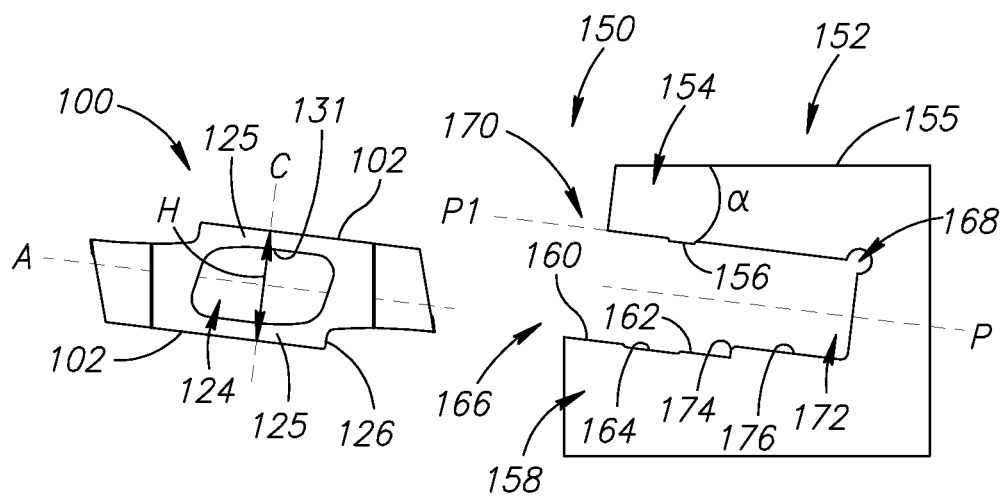
FIG. 4 is a side view of the cutting tool of FIG. 2.

Reference is made to FIG. 1, depicting a schematic illustration of a cutting tool 150, in an assembled state, herein also referred to as a second state. FIG. 2 depicts a schematic illustration of the cutting tool 150 of FIG. 1, in a non-assembled state, herein also referred to as a first state. FIGS. 3 and 4 are side views of the cutting tool 150 of FIGS. 1 and 2, respectively. The cutting tool 150 includes a tool holder 152 and at least one cutting insert 100. The tool holder 152 includes an upper retainer 154, a base retainer 158 and an insert receiving pocket 166 defined therebetween. The upper retainer 154 has an upper retainer clamping surface 156. The base retainer 158 has at least a first base retainer clamping surface 160. Optionally, the base retainer 158 may also have a second base retainer clamping surface 162, spaced apart from the first base retainer clamping surface 160), and extending parallel thereto. The insert receiving pocket 166 has an open front end 170 and a closed rear end 172.

Figure 8:
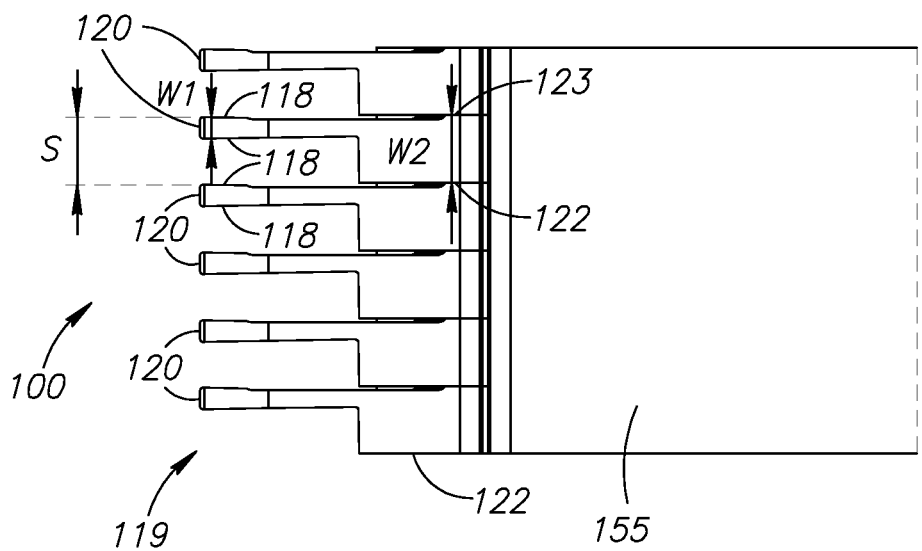
FIG. 8 is a top view of the cutting tool of FIG. 1.
Figure 9:
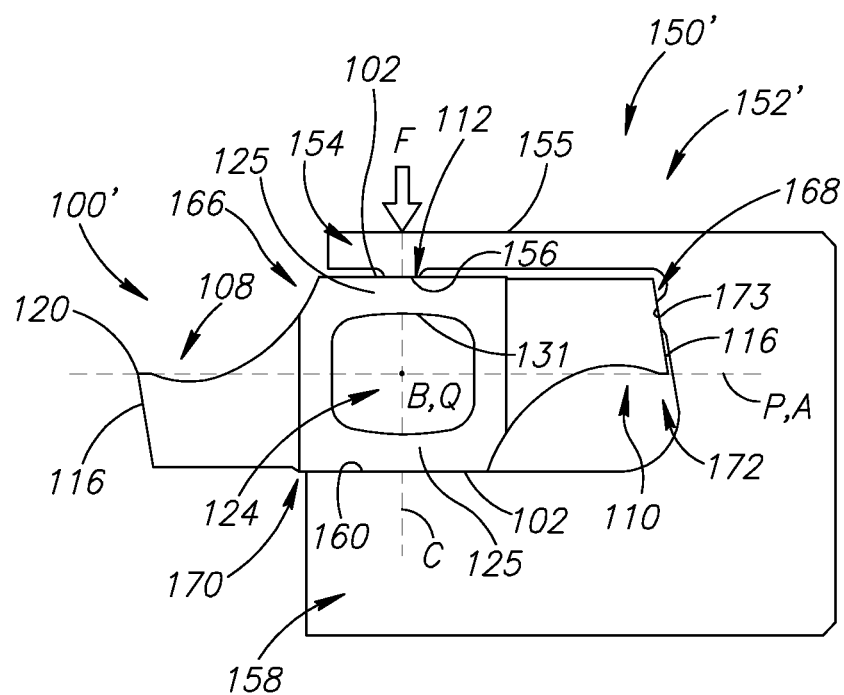
FIG. 9 is a side view schematic illustration of a cutting tool in accordance with another embodiment of the present invention, in an assembled state.

A holder top surface 155 extends above the upper retainer 154 in a side view of the tool holder 152. In some embodiments, the holder top surface 155 is planar and may be tilted by a first angle α relative to an upper retainer inner surface plane P1, which is defined by, and may be parallel to the upper retainer clamping surface 156 (FIG. 4). Although the tool holder 150 of the embodiment depicted in FIGS. 1-8 includes both first and second base retainer clamping surfaces 160, 162, it should be understood that a tool holder according to the present invention may include only one base retainer clamping surface (such as the first base retainer clamping surface 160), for example, as depicted in the embodiment of FIG. 9.

Figure 5:
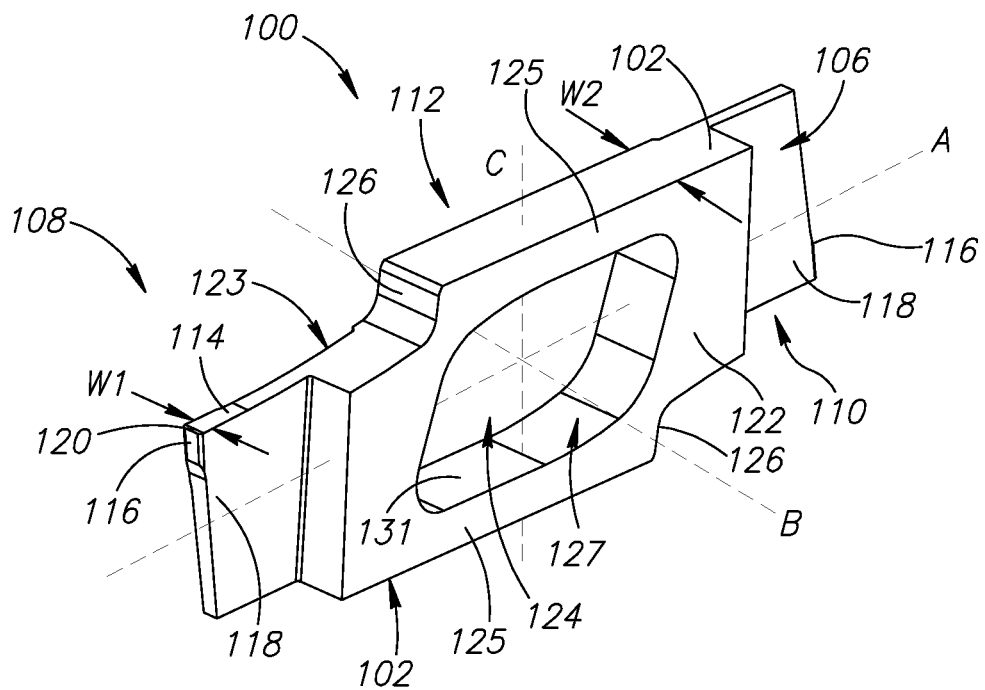
FIG. 5 is a perspective view of a cutting insert of the cutting tool of FIG. 1.
Figure 6:
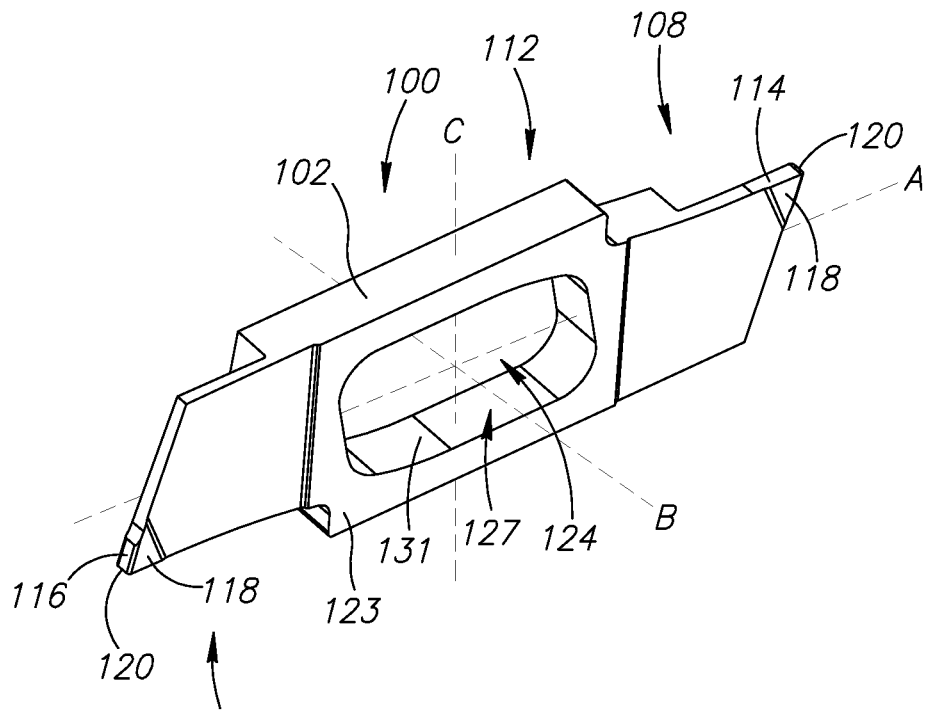
FIG. 6 is another perspective view of a cutting insert of the cutting tool of FIG. 1.
Figure 7:
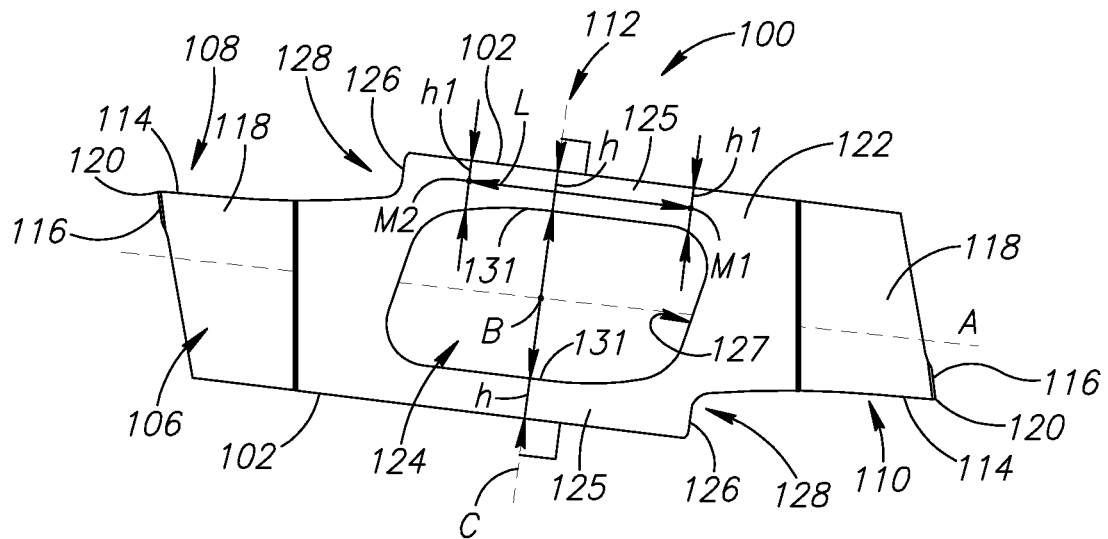
FIG. 7 is a side view of the cutting insert of FIG. 5.

With further reference to FIGS. 5 and 6, the cutting insert 100 is an indexable cutting insert, having an insert longitudinal axis A, an insert lateral axis B, and an insert vertical axis C, the axes being mutually perpendicular, and intersecting at the center of the cutting insert 100. The cutting insert 100 includes two opposite insert end surfaces 102 and a peripheral surface 106 extending therebetween. The insert end surfaces 102 may be substantially perpendicular to the insert vertical axis C, as indicated, for example, in FIG. 7. The cutting insert 100 also has two opposite cutting portions 108, 110 and a central clamping portion 112 located therebetween, and arranged along the insert longitudinal axis A.

Each of the cutting portions 108, 110 includes a rake surface 114, a front relief flank 116 and two side relief flanks 118. A cutting edge 120 is formed at an intersection of the rake surface 114 and the front relief flank 116. The side relief flanks 118 define a first width W1 adjacent the front relief flank 116.

The clamping portion 112 includes first and second parallel side abutment surfaces 122, 123 extending between the two opposite insert end surfaces 102 and defining a second width W2 therebetween. The first and second parallel side abutment surfaces 122, 123 may be substantially parallel to the insert longitudinal axis A. The second width W2 is greater than the first width W1. The clamping portion 112 also includes two opposite elongated resilient beams 125 with a flexibility aperture 124 therebetween. The flexibility aperture 124 opens out to the first and second side abutment surfaces 122, 123. Each of the resilient beams 125 extends longitudinally between a respective one of the insert end surfaces 102 and the flexibility aperture 124. The two resilient beams 125 are the only resilient portions of the cutting insert 100. In the present embodiment, the cutting insert 100 includes one flexibility aperture 124, located substantially at the center of the clamping portion 112. Thus, the flexibility aperture 124 is spaced apart from the cutting portions 108, 110, and thus is unsuitable for retaining a cutting insert, unlike insert slots found in holder blades known to those of skill in the art. Likewise, the clamping portion 112 does not include the cutting edges 120 or, for that matter, any sections that cut (i.e., the cutting edges 120 are spaced apart from the clamping portion 112). In some embodiments, the flexibility aperture 124 may have a substantially rectangular shape.

The flexibility aperture 124 allows the cutting insert 100 to elastically deform in the vertical direction, along the insert vertical axis C, as will be elaborated herein below. The flexibility aperture 124 has an inner wall 127. The inner wall 127 may be a continuous wall forming a closed contour, in a side view of the cutting insert 100. The inner wall 127 includes at least one longitudinal wall section 131. In some forms of the flexibility aperture 124, the two opposite elongated resilient beams 125 are formed between the longitudinal wall sections 131 of the inner wall 127 and the insert end surfaces 102. Each of the elongated resilient beams 125 has a beam center height h, which is the distance between the each of the insert end surfaces 102 and the adjacent longitudinal wall section 131, along the insert vertical axis C (i.e., in a side view of the cutting insert 100). Each of the resilient beams 125 is capable of bending towards the flexibility aperture 124, under an applied force on the respective insert end surface 102, as will be elaborated herein below.

Each of the resilient beams 125 has a longitudinal beam length L between two laterally-extending beam end axes M1, M2, found in the clamping portion 112 on opposite sides of the insert vertical axis C. The beam end axes M1, M2 are located where the vertical distance between the respective insert end surface 102 and the inner wall 127 of the flexibility aperture 124 is a maximum beam height h1. The maximum beam height h1 is larger than the beam center height h, for example, by approximately 10-20%. The beam length L is larger than the beam center height h, for example, the beam length L is between 3 to 6 times as large as the beam center height h.

According to an embodiment of the present invention, the clamping portion 112 may further includes two opposite stopper portions 126, extending substantially parallel to the insert lateral axis B. Each of the stopper portions 126 is formed on a respective one of the insert end surfaces 102. In a side view of the cutting insert 100, each stopper portion 126 forms a step 128 in the respective insert end surface 102. It is noted, that the stopper portions 126 may be substantially parallel to the insert vertical axis C.

It is noted, that according to another embodiment of the present invention, the cutting insert 100 includes the two opposite stopper portions 126, and does not include a flexibility aperture 124 therein. That is, the step-like stopper portions 126 may be employed in cutting inserts that have a continuous full clamping portion with no flexibility aperture formed therein.

An insert height H extends between the insert end surfaces 102, along the insert vertical axis C, in a side view of the cutting insert 100. Due to manufacturing differences and tolerances of the cutting insert 100, which is usually formed of a hard metal (e.g., pressed cemented carbide), the insert height H may vary between different cutting inserts 100.

In the presently described embodiment and accompanying drawings, the cutting tool 150 includes a plurality of cutting inserts 100, and in particular six cutting inserts 100. However, it should be understood that the cutting tool 150 may include at least one cutting insert 100, without limitation to a particular number of cutting inserts 100.

The cutting tool 150 has a first non-assembled state and a second assembled state. In the first state each of the cutting inserts 100 is in a non-clamped position, and in the second state the cutting inserts 100 is in a clamped position. In the first state of the cutting tool 150 there is no force applied on the holder top surface 155 and thus no force applied on the insert end surfaces 102. In the non-clamped position of the cutting inserts 100, the resilient beams 125 are in a neutral, unbent, position.

The tool holder 152 has a holder plane P passing through the insert receiving pocket 166. The holder plane P includes a holder lateral axis Q thereon. The cutting inserts 100 are placed in the insert receiving pocket 166, such that the insert longitudinal and lateral axes A, B are located in the holder plane P. Further, the insert lateral axis B of the cutting inserts 100 substantially coincides with the holder lateral axis Q.

When all of the cutting inserts 100 are placed within the insert receiving pocket 166, a force F is applied on the holder top surface 155, having a vertical force component (i.e., along the vertical axes C of the cutting inserts 100), moving the cutting tool 150 to the second state. The upper retainer clamping surface 156 is pressed against the adjacent one of the insert end surfaces 102 of the cutting inserts 100, at the clamping portion 112 and along the respective resilient beam 125. The upper retainer clamping portion 156 is the only clamping surface of the upper retainer 154, and thus the cutting insert 100 is clamped only at the clamping portion 112 thereof. That is, the cutting insert 100 is clamped at a spaced apart location from its cutting edges 120. The insert height H of each cutting insert 100 may be slightly different, due to production tolerances. Thus, the upper retainer clamping surface 156 is pressed until firmly contacting the adjacent one of the insert end surfaces 102 of all of the cutting inserts 100. The force F may be applied, for example, by a press or clamp member, extending laterally along the holder top surface 155.

In a case where a certain cutting insert 100 has an insert height H greater than the other cutting inserts 100, the upper retainer clamping surface 156 would be pressed down against the respective insert end surfaces 102 of that cutting insert 100 along the resilient beam 125 (i.e., in the vicinity of the flexibility aperture 124), thereby bending the resilient beam 125 towards the base retainer 158. In particular, the upper retainer clamping surface 156 would press down against the adjacent resilient beam 125, urging the cutting insert 100 with the greater insert height H, to elastically deform in the vertical direction, compressing towards the base retainer 158. The resilient beam 125 which is pressed by the upper retainer clamping surface 156, undergoes beam deflection, and bends (i.e., elastically deforms) towards the flexibility aperture 124. In this manner, the upper retainer clamping surface 156 is pressed towards the base retainer 158 until firmly contacting the adjacent one of the insert end surfaces 102 of each of the cutting inserts 100 in the tool holder 152, thereby placing the cutting tool 150 in its second state (i.e., assembled state). It is noted that during the beam bending or deflection of the resilient beam 125, the beam end axes M1, M2 are substantially static.

In the second state of the cutting tool 150 (e.g., FIGS. 1 and 3), the cutting inserts 100 are in the clamped position, retained within the insert receiving pocket 166, with one of the insert end surfaces 102 of each cutting insert 100 abutting the upper retainer clamping surface 156 along the respective resilient beam 125, in the vicinity of the respective flexibility aperture 124. Further, the other one of the insert end surfaces 102 of each cutting insert 100 abuts the first and second base retainer clamping surfaces 160, 162. When a plurality of cutting inserts 100 are employed, the cutting inserts 100 are arranged in an insert stack 119, side by side, such that the first side abutment surface 122 of one of the cutting inserts 100 abuts the second side abutment surfaces 123 of an adjacent cutting insert 100 (e.g., as indicated in FIG. 8). Generally considering the insert stack 119, a given side abutment surface 122, 123 of each of the cutting inserts 100 abuts a different side abutment surface 123, 122 of the adjacent one of the cutting inserts 100. While FIG. 8 shows the cutting inserts 100 in insert stack 119 to be identical, it is also possible for an insert stack to contain cutting inserts with non-identical cutting portions to, for example, form grooves of varying shape or depth adjacent to one another.

When the cutting inserts 100 are inserted into the insert receiving pocket 166, one of the cutting edges 120 of each cutting insert 100 is an active cutting edge, and the other cutting edge 120 is a non-active cutting edge. The active cutting edge 120 of each of the cutting inserts 100 (in this case, the cutting edge 120 of the cutting portion 108) is located outside the open end 170 of the insert receiving pocket 166. The non-active cutting edge 120 of each one of the cutting inserts 100 (in this case, the cutting edge 120 of the cutting portion 110) is located adjacent the rear end 172 of the insert receiving pocket 166. However, the non-active cutting edge 120 of each one of the cutting inserts 100 does not contact the walls of the insert receiving pocket 166. In this manner, the non-active cutting edge 120 is not subject to clamping forces applied on each of the cutting inserts 100, and thus prevented from mechanical damage, such as possible fracture and breakage during cutting operations.

Reference is made to FIG. 8, depicting a top view of the cutting tool 150. The second width W2, adjacent the side abutment surfaces, is greater than the first width W1, adjacent the cutting edges 120 of the cutting inserts 100. A lateral spacing S is formed between two adjacent cutting inserts 100, in particular, the lateral spacing S is formed between the same location along each of the cutting edges 120 of the two adjacent cutting inserts 100. In this manner, as seen in the top view (e.g., taken along one of the insert vertical axes C), or in a front view (e.g., along the holder longitudinal plane P), the insert stack 119 of cutting inserts 100 forms a series of evenly spaced apart and parallel cutting edges 120. Such a series of adjacent cutting edges 120 is suitable for making parallel uniformly spaced-apart grooves in a work piece, or for cutting out uniform slices of metal, for example, uniform rings of metal beams, pipes and the like. Since the uniform lateral spacing S is formed by the geometrical structure of the cutting inserts 100, it is not necessary to include additional spacers for laterally separating the cutting insert 100 from one another. The magnitude of the lateral spacing S is determined according to the first and second widths W1, W2, which may be formed according to specific requirements of the cutting tool 150 in particular cutting operations (e.g., desired thickness of the metal slices or rings to be cut, and the like).

The base retainer 158 may further include a lateral recess 164 extending laterally between the first and second base retainer clamping surfaces 160, 162. The lateral recess 164 is an indented recess, extending substantially parallel to the holder lateral axis Q, and thus parallel to the base retainer clamping surfaces 160, 162. The lateral recess 164 ensures that the first and second base retainer clamping surfaces 160, 162 are separated from one another, providing two spaced apart contact regions between the base retainer 158 and the insert end surface 102, which is adjacent the base retainer 158. This provides better clamping of the cutting insert 100 within the insert receiving pocket 166.

When the cutting inserts 100 are in the clamped position, retained by the upper and base retainers 154, 158, side retainers may be placed at the lateral ends of the insert receiving pocket 166. This may be done in order to prevent the outermost cutting inserts 100 from being extracted from the insert receiving pocket 166 in the lateral direction.

With further reference to FIG. 4, according to an embodiment of the present invention, the base retainer 158 further includes a holder stopper portion 174 extending along the base retainer second clamping surface 162 and substantially parallel thereto. The base retainer 158 also includes a raised portion 176, located adjacent the rear end 172 of the insert receiving pocket 166. The holder stopper portion 174 couples the second base retainer clamping surface 162 and the raised portion 176, forming a step-like shape in a side view of the tool holder 152.

In the embodiment depicted in the drawings, the upper retainer 154 and the base retainer 158 are formed as a one piece unitary construction. In this case, the tool holder 152 may also include a holder elasticity recess 168 extending laterally (i.e., parallel to the holder lateral axis Q) in the rear end 172 of the insert receiving pocket 166, adjacent the upper retainer 154. The holder elasticity recess 168 allows the upper retainer 154 to elastically move towards and away from the base retainer 158, when force is applied thereon, for example, when clamping the cutting insert 100 (e.g., FIG. 3).

In the embodiment where the clamping portion 112 of each cutting insert 100 includes the insert stopper portions 126, each cutting insert 100 is inserted into the insert receiving pocket 166, until one of the insert stopper portions 126 abuts the holder stopper portion 174. Thereby the holder stopper portion 174 prevents each of the cutting inserts 100 from moving further into the insert receiving pocket 166. Further, all of the cutting inserts 100 are stopped at the holder stopper portion 174, thereby aligning all of the cutting insert 100 in a similar longitudinal position.

Each insert stopper portion 126 is formed on the clamping portion 112, between the first and second side abutment surfaces 122, 123, and thus it is as wide as the second width W2. In this manner, the cutting insert 100 is stopped against the holder stopper portion 174, at the wider portion thereof. This provides further stability and strength in stopping the cutting insert 100, as it is stopped against the holder stopper portion 174 at the wider portion thereof.

Further, each of the insert stopper portions 126 is thus spaced apart from the nearest cutting portion 108, 110. If one of the cutting portions 108, 110 is damaged or breaks during a cutting operation, the cutting insert 100 may still be indexed and retained in the holder 152, with the insert stopper portion 126 abutting the holder stopper portion 174, even in the case where the nearest cutting portion is damaged.

It should be appreciated that each of the cutting inserts 100 is an indexable insert, with a rotational symmetry of 180° about the insert lateral axis B. Therefore, when one of the cutting inserts 100 is indexed, the cutting edge 120 that was active prior to indexing, is located adjacent the rear end 172 of the insert receiving pocket 166 after indexing. The insert end surface 102 that was adjacent the upper retainer 154 prior to indexing, is located adjacent the base retainer 158 after indexing, abutting the first and second base retainer clamping surfaces 160, 162.

In multi grooving or multi parting tools, the cutting edge wear may be asymmetrical between the various cutting inserts 100. Thus, it is preferable to have the option of indexing only selected ones of the cutting inserts 100, in which the cutting edge wear is more notable than others. In the present invention, when the force F is relieved from the holder top surface 155, the cutting inserts 100 are in the non-clamped position, such that each of the cutting inserts 100 may be pulled out of the insert receiving pocket 166 along its longitudinal axis A, and then returned after indexing or replaced by a new cutting insert 100.

When the cutting inserts 100 are arranged in the tool holder 150, the flexibility apertures 124 of the cutting inserts 100 are substantially longitudinally aligned relative to one another, forming a unitary stack aperture 129 (FIG. 1). The cutting inserts 100 may be extracted together as a group from the insert receiving pocket 166, for example in order to index the cutting inserts 100. This may be performed with an elongated indexing bar, which can be passed laterally through the stack aperture 129. It is noted that FIG. 2 depicts the cutting inserts 100 being located adjacent one another outside the insert receiving pocket 166. However, it should be understood that the cutting inserts 100 may be inserted separately, i.e., one by one, into the insert receiving pocket 166. Alternatively, the cutting inserts 100 may be inserted together as a group into the insert receiving pocket 166, for example, by employing the elongated indexing bar.

Reference is now made to FIG. 9, which depicts a side view of a cutting tool 150', according to another embodiment of the present invention. The cutting tool 150' includes a tool holder 152' and at least one cutting insert 100' retained therein. For example, the cutting tool 150' includes an insert stack 119 of cutting inserts 100'. The differences between this embodiment and the first embodiment of FIGS. 1-8, is that the cutting inserts 100' do not include the step-like insert stopper portions 126, and the holder 152' has a holder rear stopper 173 formed in the rear end 172 of the insert receiving pocket 166, instead of the step-like holder stopper portion 174. Further, the base retainer 158 includes only the first base retainer clamping surface 160 (i.e., the base retainer 158 does not include the base retainer clamping surface 162). The cutting inserts 100' are inserted into the insert receiving pocket 166, until the front relief flank 116 adjacent the cutting edge 120 which is non-active, abuts the holder rear stopper 173.

Similarly to the above discussed cutting tool 150 of FIGS. 1-8, the cutting inserts 100' are retained within the insert receiving pocket 166, such that one of the insert end surfaces 102 of each cutting insert 100' abuts the upper retainer clamping surface 156 along the resilient beam 125, in the vicinity of the respective flexibility aperture 124. Further, the other one of the insert end surfaces 102 of each cutting insert 100' abuts the first base retainer clamping surface 160. When the cutting tool 150' includes an insert stack 119 of cutting inserts 100', a given side abutment surface 122, 123 of each of the cutting inserts 100' abuts a different side abutment surface 123, 122 of the adjacent one of the cutting inserts 100'.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. An indexable cutting insert (100, 100') having an insert longitudinal axis (A), an insert lateral axis (B) and an insert vertical axis (C), the cutting insert (100, 100') comprising:
    two opposite insert end surfaces (102), and a peripheral surface (106) extending therebetween;
    two opposite cutting portions (108, 110) and a clamping portion (112) located therebetween, arranged along the insert longitudinal axis (A),
    wherein:
    each of the cutting portions (108, 110) comprises a rake surface (114), a front relief flank (116) and two side relief flanks (118), with a cutting edge (120) formed at an intersection of the rake surface (114) and the front relief flank (116), the side relief flanks (118) defining a first width (W1);
    the clamping portion (112) does not include the cutting edges (120), and comprises:
        first and second side abutment surfaces (122, 123) extending between the two insert end surfaces (102), the first and second side abutment surfaces (122, 123) defining a second width (W2), the second width (W2) being greater than the first width (W1),
        two opposite elongated resilient beams (125) with a flexibility aperture (124) therebetween, the flexibility aperture (124) opening out to the first and second side abutment surfaces (122, 123), each of the resilient beams (125) is located between a respective one of the insert end surfaces (102) and the flexibility aperture (124), the flexibility aperture (124) being spaced apart from the cutting portions (108, 110),
        the only resilient portions of the cutting insert (100, 100') are the two resilient beams (125).

2. The cutting insert (100, 100') according to claim 1, wherein the clamping portion (112) further comprises two opposite laterally extending stopper portions (126), each formed on a respective one of the insert end surfaces (102).

3. The cutting insert (100, 100') according to claim 2, wherein each stopper portion (126) forms a step (128) in the respective one of the insert end surfaces (102).

4. The cutting insert (100, 100') according to claim 1, wherein each of the resilient beams (125) is capable of bending towards the flexibility aperture (124), under an applied force on the respective insert end surface (102).

5. The cutting insert (100, 100') according to claim 1, wherein the flexibility aperture (124) has a continuous inner wall (127) forming a closed contour, in a side view of the cutting insert (100, 100').

6. The cutting insert (100, 100') according to claim 4, wherein each of the resilient beams (125) is located between the inner wall (127) and the respective insert end surface (102), each of the resilient beams (125) having a beam center height (h) between the respective insert end surface (102) and the adjacent inner wall (127), measured along the insert vertical axis (C).

7. The cutting insert (100, 100') according to claim 6, wherein
    each of the resilient beams (125) has a longitudinal beam length (L) between two laterally extending beam end axes (M1, M2) found in the clamping portion (112) on opposite sides of the insert vertical axis (C), the beam end axes (M1, M2) being located where the respective insert end surface (102) and the inner wall (127) of the flexibility aperture (124) are spaced apart by a predetermined maximum beam height (h1); and
    the beam length (L) is between 3 to 6 times as large as the maximum beam height (h1).

8. The cutting insert (100, 100') according to claim 7, wherein the maximum beam height (h1) is 10% to 20% larger than the beam center height (h).

9. A cutting tool (150, 150') comprising a tool holder (152, 152') and at least one cutting insert (100, 100') in accordance with claim 1.

10. The cutting tool (150, 150') according to claim 9, wherein:
    the tool holder (152, 152') comprises:
        an upper retainer (154) having an upper retainer clamping surface (156);
        a base retainer (158) having at least a first base retainer clamping surface (160);
        an insert receiving pocket (166) defined between the upper retainer (154) and the base retainer (158), and having a front end (170) and a rear end (172); and
        a holder top surface (155) extending above the upper retainer (154) in a side view of the tool holder (152, 152'),
    the at least one cutting insert (100, 100') is retained within the insert receiving pocket (166), with one of the insert end surfaces (102) being located adjacent the upper retainer clamping surface (156), and the other one of the insert end surfaces (102) abutting the at least first base retainer clamping surface (160),
    the cutting tool (150, 150') has a first state and a second state, in the first state each of the at least one cutting insert (100, 100') is in a non-clamped position, and in the second state each of the at least one cutting insert (100, 100') is in a clamped position,
    in the first state of the cutting tool (150, 150') no force is applied on the holder top surface (155), and
    in the second state of the cutting tool (150, 150') a force (F) is applied on the holder top surface (155), and the upper retainer clamping surface (156) is pressed against the adjacent insert end surfaces (102) of each of the at least one cutting insert (100, 100') along the respective resilient beam (125), and the respective resilient beam (125) of each of the at least one cutting insert (100, 100') bends towards the base retainer (158).

11. The cutting tool (150, 150') according to claim 10, wherein at least two cutting inserts (100, 100') are retained within the insert receiving pocket (166), the cutting inserts (100, 100') being arranged in an insert stack (119), with a given side abutment surface (122, 123) of each of the cutting inserts (100, 100') abutting a different side abutment surface (123, 122) of an adjacent one of the cutting inserts (100, 100').

12. The cutting tool (150, 150') according to claim 10, wherein the base retainer (158) further comprises a second base retainer clamping surface (162), spaced apart from the first base retainer clamping surface (160), and extending parallel thereto.

13. The cutting tool (150, 150') according to claim 12, wherein the base retainer (158) further comprises a lateral recess (164) extending between the first and second base retainer clamping surfaces (160, 162), and substantially parallel thereto.

14. The cutting tool (150, 150') according to claim 10, wherein:
- the tool holder (152, 152') has a holder plane (P) passing through the insert receiving pocket (166) and including a holder lateral axis (Q) thereon,
- when the at least one cutting insert (100, 100') is in the insert receiving pocket (166), the insert longitudinal and lateral axes (A, B) are located in the holder plane (P), and the insert lateral axis (B) substantially coincides with the holder lateral axis (Q).

15. The cutting tool (150) according to claim 10, wherein:
- the clamping portion (112) of the at least one cutting insert (100) comprises two opposite insert stopper portions (126), each formed on a respective one of the insert end surfaces (102), and extending substantially parallel to the insert lateral axis (B),
- the base retainer (158) further comprises a laterally extending holder stopper portion (174), and
- one of the insert stopper portions (126) abuts the holder stopper portion (174).

16. The cutting tool (150') according to claim 10, wherein:
- the insert receiving pocket (166) comprises a holder rear stopper (173) formed in the rear end (172) of the insert receiving pocket (166), and
- one of the front relief surfaces (116) of the cutting insert (100') abuts the holder rear stopper (173).

17. An insert stack (119) comprising a plurality of indexable cutting inserts (100, 100') in accordance with claim 1, wherein the cutting inserts (100, 100') are arranged side by side, with a given side abutment surface (122, 123) of each of the cutting inserts (100, 100') abutting a different side abutment surface (123, 122) of an adjacent one of the cutting inserts (100, 100').

18. The insert stack (119) according to claim 17, wherein all the cutting inserts are identical.

* * * * *